July 10, 1934.  R. P. JACKSON  1,966,246

FLEXIBLE DRIVE MECHANISM

Filed Jan. 24, 1931

WITNESSES:

INVENTOR
Ray P. Jackson
BY
ATTORNEY

Patented July 10, 1934

1,966,246

UNITED STATES PATENT OFFICE 1,966,246

FLEXIBLE DRIVE MECHANISM

Ray P. Jackson, Berkeley, Calif., assignor to Westinghouse Electric & Manufacturing Company, a corporation of Pennsylvania Application January 24, 1931, Serial No. 511,007

4 Claims. (Cl. 74—7)

My invention relates to drive mechanisms and it has particular relation to drive mechanisms of the yieldable type.

Power transmissions of the geared non-yieldable type constructed according to the prior art offer distinct disadvantages when employed to transmit suddenly applied loads. The application of heavy and sudden loads to such transmissions causes a distortion of the shaft elements, as well as over stressing of the gear teeth, with the inevitable result of frequent breakage of shafts and gears.

It has been proposed to remedy this disadvantage by providing various forms of flexible couplings, but the devices proposed have not proved fully satisfactory or practical under conditions of excessive and sudden variable loads.

It is, accordingly, an object of my invention to provide a flexible drive mechanism which shall be simple and easy to construct, as well as economical to manufacture and maintain.

Another object of my invention is to provide for absorbing, in a drive mechanism, a portion of the energy applied when the drive is subjected to a sudden application of or variation in torque to prevent the imposing on the members of the drive strains in excess of that for which they are designed.

Other objects will appear from the specification which follows.

According to my invention, I provide a yieldable transmission which is adapted to compensate for sudden and excessive strains imposed on the members of the transmission.

Figure 1:
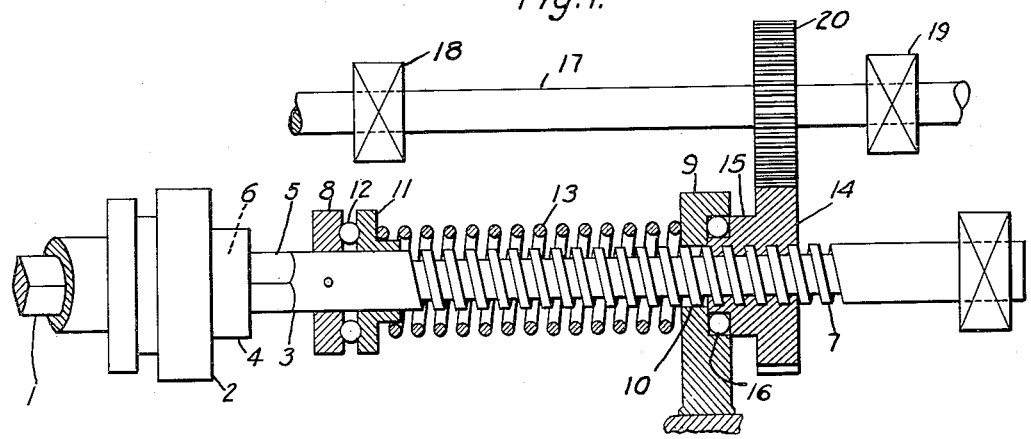
Figure 2:
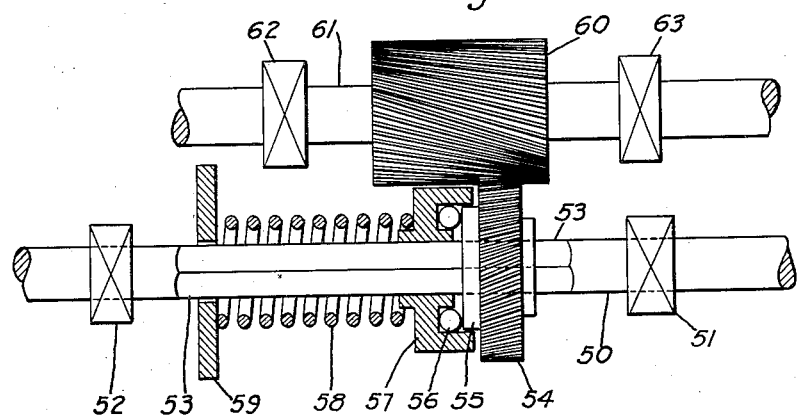

Figure 1 is a plan view, partly in section, showing one form of my improved flexible drive mechanism; and Fig. 2 is a similar view of a modification of the drive mechanism shown in Fig. 1.

As illustrative of the present invention, I have shown in the drawing a drive shaft 1 comprising relatively-movable members 2 and 3 disposed in slidable engagement with each other. The member 2 is provided with a clutch 4 for connecting the driving shaft 1 to a means for rotating it. The movable member 3 is provided with a splined end 5 which slidably engages an aperture 6 provided therefor in the member 2, whereby the member 3 will rotate with the member 2 but may slide endwise relative thereto.

The member 3 is provided with a threaded portion 7 opposite the splined end 5. A collar 8, integral with member 3, is disposed intermediate the splined portion 5 and the threaded portion 7. A fixed bearing 9 supports member 3 and is provided with an aperture 10 which receives the threaded portion 7 of the member 3. A floating collar 11 is mounted on member 3, intermediate the fixed collar 8 and the bearing 9, and is separated from the fixed collar 8 by a plurality of ball bearings 12. A coil spring 13 is disposed around the member 3 and is maintained in compression between the bearing 9 and the floating collar 11. A gear wheel 14 is mounted on the threaded portion 7 adjacent to the bearing 9. A thrust collar 15 is disposed between the bearing 9 and the gear 14. A plurality of balls 16 are mounted between the collar 15 and the bearing 9 to reduce friction losses.

A driven shaft 17 is supported by bearings 18 and 19 and carries a gear wheel 20 which meshes with the gear wheel 14. Power may be transmitted from the drive shaft 1 to the driven shaft 17 through the gear wheels 14 and 20.

In operation, in the event that a sudden load is applied to the shaft 1, the shaft momentarily absorbs the excessive energy applied and then returns it, thus preventing any distortion of it. When the sudden load is applied, the force of the screw action between the gear wheel 14 and the threaded portion 7, tending to prevent relative axial movement therebetween, is overcome, and the member 3 moves longitudinally relative to the gear wheel 14. This movement of the member 3 endwise compresses the spring 13 until the force of the spring is equal to the force tending to move the member 3 endwise. As soon as the torque applied to the shaft 1 is reduced, the force tending to move the member 3 endwise will become less than the force stored in the spring 13, whereby the spring 13 will move the member 3 back to its normal position, thereby returning energy to the shaft.

Fig. 2 shows a modification of the yieldable shafting, wherein a shaft 50 is mounted in bearings 51 and 52. The shaft 50 is provided with a square portion 53 intermediate the bearings 51 and 52. A gear wheel 54 is slidably mounted on the square portion 53 and rotates therewith. A collar 55, integral with the gear wheel 54, engages a plurality of bearing balls 56 which, in turn, engage a floating collar 57. A coil spring 58 is disposed around the shaft 50 intermediate the floating collar 57 and a fixed stationary abutment 59. The gear wheel 54 meshes with a wide-face helical gear wheel 60 mounted on a shaft 61 intermediate the bearings 62 and 63.

In operation, when a load is applied suddenly to the shaft 50, the gear wheel 54 travels endwise against the spring 58 until the force of the spring is equal to the force exerted longitudinally by the action between the threads on the two gear wheels 54 and 60. The excess energy in the shaft 50 is absorbed by the spring 58 and is returned to the shaft 50 when the torque, being transmitted by the shaft, is reduced. The gear wheel 54 moves endwise, relative to the gear wheel 60, whereby the latter is accelerated and moved into its normal operating position relative to the gear wheel 54 when the torque is reduced.

Various changes may be made in the specific embodiment of the present invention within the scope of the appended claims without departing from the spirit of the invention.

I claim as my invention:

1. In a transmission system, in combination, a driven shaft, a gear wheel mounted thereon, a drive shaft comprising sections, one of which is movable axially relative to the other, said movable section being provided with a threaded portion, and a collar portion, a bearing supporting said movable section, a spring disposed between said bearing and said collar portion for limiting the longitudinal movement of said movable section, and a gear wheel having a central threaded opening mounted on the threaded portion of said movable section adjacent to said fixed bearing and meshing with said gear wheel on said driven shaft.

2. In a transmission system, in combination, a driven shaft, a gear wheel mounted thereon, a drive shaft comprising sections, one of which is rotatable with, and movable axially relative to, the other section, said movable section being provided with a threaded portion, yieldable means for permitting relative axial movement between said sections, a fixed bearing carrying said movable section, and a gear wheel threadably engaging said threaded portion and in mesh with said gear wheel on said driven shaft.

3. In a transmission system, in combination, a driven shaft, a driven gear wheel mounted thereon, a drive shaft comprising sections, one of which is rotatable with, and axially movable relative to, the other of said sections, said movable section being provided with a threaded portion and an abutment portion, a driving gear wheel threadably engaging said threaded portion and meshing with said driven gear wheel, a bearing for carrying said movable section and contacting said driving gear wheel, said movable section being adapted to move axially relative to said driving gear wheel when a sudden load is applied to said drive shaft, and yieldable means interposed between said abutment portion and said bearing to bring said movable section back to its normal operating position.

4. In a transmission system, in combination, a driven shaft, a driven gear wheel mounted on said shaft, a drive shaft comprising members, one of which is rotatable with, and axially movable relative to, another of said members, said movable member having one end formed to fit into an aperture provided in said other member and the opposite end provided with a threaded portion, an abutment portion provided on said movable member, a spring associated with said movable member and said abutment portion for resisting axial movement thereof with relation to the said other member, a fixed bearing carrying said slidable member and constraining said spring against said abutment, and a driving gear wheel mounted on said threaded portion of said slidable member adjacent to said bearing and in mesh with said driven gear wheel.

RAY P. JACKSON.